(12) United States Patent
Jang (10) Patent No.: US 8,711,787 B2
(45) Date of Patent: Apr. 29, 2014

(54) COMMUNICATION SYSTEM INCLUDING RELAY STATION AND DATA FRAME FOR THE COMMUNICATION SYSTEM

(75) Inventor: Kyung Hun Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 590 days.

(21) Appl. No.: 12/512,801

(22) Filed: Jul. 30, 2009

(65) Prior Publication Data

US 2010/0226305 A1    Sep. 9, 2010

(30) Foreign Application Priority Data

Mar. 4, 2009   (KR) .......................... 10-2009-0018385

(51) Int. Cl.
*H04W 4/06* (2009.01)
*H04W 4/00* (2009.01)

(52) U.S. Cl.
USPC ............ 370/329; 370/312; 370/437; 370/443

(58) Field of Classification Search
None
See application file for complete search history.

(56) References Cited

U.S. PATENT DOCUMENTS

2006/0256761 A1*  11/2006  Meylan et al. ................. 370/338
2007/0160014 A1*   7/2007  Larsson ......................... 370/338
2008/0107035 A1*   5/2008  Zhu et al. ....................... 370/241
2008/0107110 A1*   5/2008  Andou et al. .................. 370/390
2008/0108369 A1*   5/2008  Visotsky et al. ............... 455/455
2008/0212512 A1*   9/2008  Harpek et al. ................. 370/315
2008/0219202 A1*   9/2008  Pandey et al. ................. 370/315
2010/0027458 A1*   2/2010  Wu et al. ....................... 370/315
2010/0039947 A1*   2/2010  Li et al. ......................... 370/252

FOREIGN PATENT DOCUMENTS

| KR | 10-2008-0047001 | 5/2008 |
| KR | 10-2008-0053077 | 6/2008 |
| KR | 10-2008-0076625 | 8/2008 |
| KR | 10-2008-0086594 | 9/2008 |
| KR | 10-2008-0090029 | 10/2008 |

* cited by examiner

*Primary Examiner* — Andrew Chriss
*Assistant Examiner* — Joshua A Kading
(74) *Attorney, Agent, or Firm* — NSIP Law

(57) ABSTRACT

Provided is a communication method and a data frame for a communication system having a relay station. An uplink sub-frame of the data frame may include a first uplink relay sub-frame which corresponds to a time frame where relay stations selected among a plurality of relay stations simultaneously transmit uplink relay signals to a base station, and a second uplink relay sub-frame which corresponds to a time frame where the remaining relay stations transmit remaining uplink relay signals to the base station using a scheduled radio resource. A downlink sub-frame of the data frame may include a first downlink relay sub-frame which corresponds to a time frame where a base station simultaneously transmits downlink relay signals to relay stations selected from among a plurality of relay stations, and a second downlink relay sub-frame which corresponds to a time frame where the base station transmits remaining downlink relay signals to the remaining relay stations using a scheduled radio resource.

22 Claims, 9 Drawing Sheets

COMMUNICATION SYSTEM INCLUDING RELAY STATION AND DATA FRAME FOR THE COMMUNICATION SYSTEM

CROSS-REFERENCE TO RELATED APPLICATION(S)

This application claims the benefit under 35 U.S.C. §119(a) of a Korean Patent Application No. 10-2009-0018385, filed on Mar. 4, 2009, in the Korean Intellectual Property Office, the entire disclosure of which is incorporated herein by reference for all purposes.

BACKGROUND

1. Field

The following description relates to a communication system including a relay station, and a data frame used in the communication system.

2. Description of Related Art

Researches into a communication system having relay stations have been actively conducted. In general, a single cell communication system includes a plurality of relay stations and a plurality of terminals. Here, the plurality of relay stations may extend the coverage of a cell and may increase the capacity of the cell.

In a communication system having relay stations, a base station and the relay stations may be connected via radio links or radio channels. In this instance, radio resources may need to be appropriately assigned and a data frame may need to be optimally designed, and thus, the radio links between the base station and the relay stations are able to support a capacity desired.

However, excessive assignment of the radio resource, especially a time resource, for the radio links between the base station and the relay stations may be inefficient. As an example, when a number of the relay stations increases, excessive time resources may be assigned for the radio link between the base station and the relay stations, and thus, time resource assigned to the remaining radio links, as an example, radio links between the base station and terminals, may be relatively insufficient. Accordingly, a throughput of the entire communication system may decrease.

SUMMARY

According to one general aspect, there is provided a communication device configured to perform an uplink communication according to a data frame having an uplink sub-frame, the uplink sub-frame including a first uplink relay sub-frame which corresponds to a time frame where relay stations selected among a plurality of relay stations simultaneously transmit uplink relay signals to a base station, and a second uplink relay sub-frame which corresponds to a time frame where the remaining relay stations among the plurality of relay stations transmit remaining uplink relay signals to the base station using a scheduled radio resource.

The selected relay stations may use at least one of a transmission power control scheme, an interference control scheme, and a multi-antenna transmission scheme to simultaneously transmit the uplink relay signals in the first uplink relay sub-frame.

The selected relay stations may transmit the uplink relay signals using the same frequency resource in the first uplink relay sub-frame.

The selected relay stations may transmit the uplink relay signals using the same frequency resource regardless of a scheduling control of the base station in the first uplink relay sub-frame.

The selected relay stations may be allowed to simultaneously transmit the uplink relay signals to the base station, and may be selected by the base station.

The selected relay stations may be determined based on channels formed between the plurality of relay stations and the base station.

A length of the first uplink relay sub-frame or a length of the second uplink relay sub-frame may be adaptively adjusted.

The uplink sub-frame may further include an uplink access sub-frame which corresponds to a time frame where a plurality of terminals transmit uplink signals to the base station or to the plurality of relay stations.

According to another general aspect, there is provided a communication device configured to perform a downlink communication according to a data frame having a downlink sub-frame, the downlink sub-frame including a first downlink relay sub-frame which corresponds to a time frame where a base station simultaneously transmits downlink relay signals to relay stations selected from among a plurality of relay stations, and a second downlink relay sub-frame which corresponds to a time frame where the base station transmits remaining downlink relay signals to the remaining relay stations among the plurality of relay stations using a scheduled radio resource.

The base station may use at least one of a transmission power control scheme, an interference control scheme, and a multi-antenna transmission scheme, to simultaneously transmit the downlink relay signals in the first downlink relay sub-frame.

The base station may transmit the downlink relay signals using the same frequency resource in the first downlink relay sub-frame.

According to still another general aspect, there is provided a base station including a channel information reception module configured to receive, from a plurality of relay stations, channel information with respect to channels formed between the plurality of relay stations and the base station, a selection module configured to select relay stations from among the plurality of relay stations based on the channel information, and a first transmission/reception module configured to simultaneously transmit downlink relay signals to the selected relay stations or to receive uplink relay signals simultaneously transmitted from the selected relay stations.

The base station may further include a scheduling module configured to schedule a radio resource for the remaining relay stations among the plurality of relay stations, and a second transmission/reception module configured to transmit remaining downlink relay signals to the remaining relay stations using the scheduled radio resource or to receive remaining uplink relay signals transmitted from the remaining relay stations.

The first transmission/reception module may transmit the downlink relay signals to the selected relay stations using at least one of a transmission power control scheme, an interference control scheme, and a multi-antenna transmission scheme.

The first transmission/reception module may receive the uplink relay signals transmitted from the selected relay stations, using at least one of a transmission power control scheme, an interference control scheme, and a multi-antenna transmission scheme.

The first transmission/reception module may transmit the downlink relay signals using the same frequency resource or receives uplink relay signals transmitted from the selected relay stations.

According to still another general aspect, there is provided a relay station including a first transmission/reception module configured to simultaneously transmit an uplink relay signal to a base station together with selected relay stations among a plurality of relay stations or to receive downlink relay signals transmitted to the selected relays from the base station, in response to the relay station being one of the relay stations selected by the base station, and a second transmission/reception module configured to receive a downlink relay signal from the base station using a scheduled radio resource or to transmit an uplink relay signal to the base station, in response to the relay station being one of the remaining relay stations among the plurality of relay stations.

The first transmission/reception module may transmit the uplink relay signal or uses at least one of a transmission power control scheme, an interference control scheme, and a multi-antenna transmission method to receive the downlink relay signals.

The selected relay stations may transmit uplink relay signals using the same frequency resource.

The relay station may further include a channel estimation module configured to estimate a downlink channel between the base station and the relay station, and a sounding packet generation module configured to generate a sounding packet used to estimate an uplink channel between the base station and the relay station, wherein the relay station is determined as one of relay stations selected according to the downlink channel or the uplink channel.

According to still another general aspect, there is provided an operational method of a base station, the method including receiving, from a plurality of relay stations, channel information with respect to channels formed between the plurality of relay stations and a base station, selecting relay stations from among the plurality of relay stations based on the channel information, and simultaneously transmitting downlink relay signals to the selected relay stations, or receiving uplink relay signals simultaneously transmitted from the selected relay stations.

The simultaneously transmitting of the downlink relay signals may include transmitting the downlink relay signals to the selected relay stations using at least one of a transmission power control scheme, an interference control scheme, and a multi-antenna transmission scheme, and the receiving of the uplink relay signals may include receiving the uplink relay signals transmitted from the selected relays using at least one of the transmission power control scheme, the interference control scheme, and the multi-antenna transmission scheme.

The simultaneously transmitting of the downlink relay signals may include transmitting the downlink relay signals using the same frequency resource.

According to still another general aspect, there is provided an operational method of a relay station, the method including simultaneously transmitting uplink relay signals to a base station together with selected relay stations among a plurality of relay stations, or receiving downlink relay signals simultaneously transmitted to the selected relays from the base station, in response to the relay station being one of the selected relay stations selected by the base station, and receiving a downlink relay signal from the base station using a radio resource scheduled by the base station, or transmitting uplink relay signal to the base station, in response to the relay station being one of the remaining relay stations among the plurality of relay stations.

The method may further include measuring a downlink channel between the base station and the relay station, and generating a sounding packet used to estimate an uplink channel between the base station and the relay station, wherein the relay station is determined as one of relay stations selected according to a state of the downlink channel or a state of the uplink channel.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1:
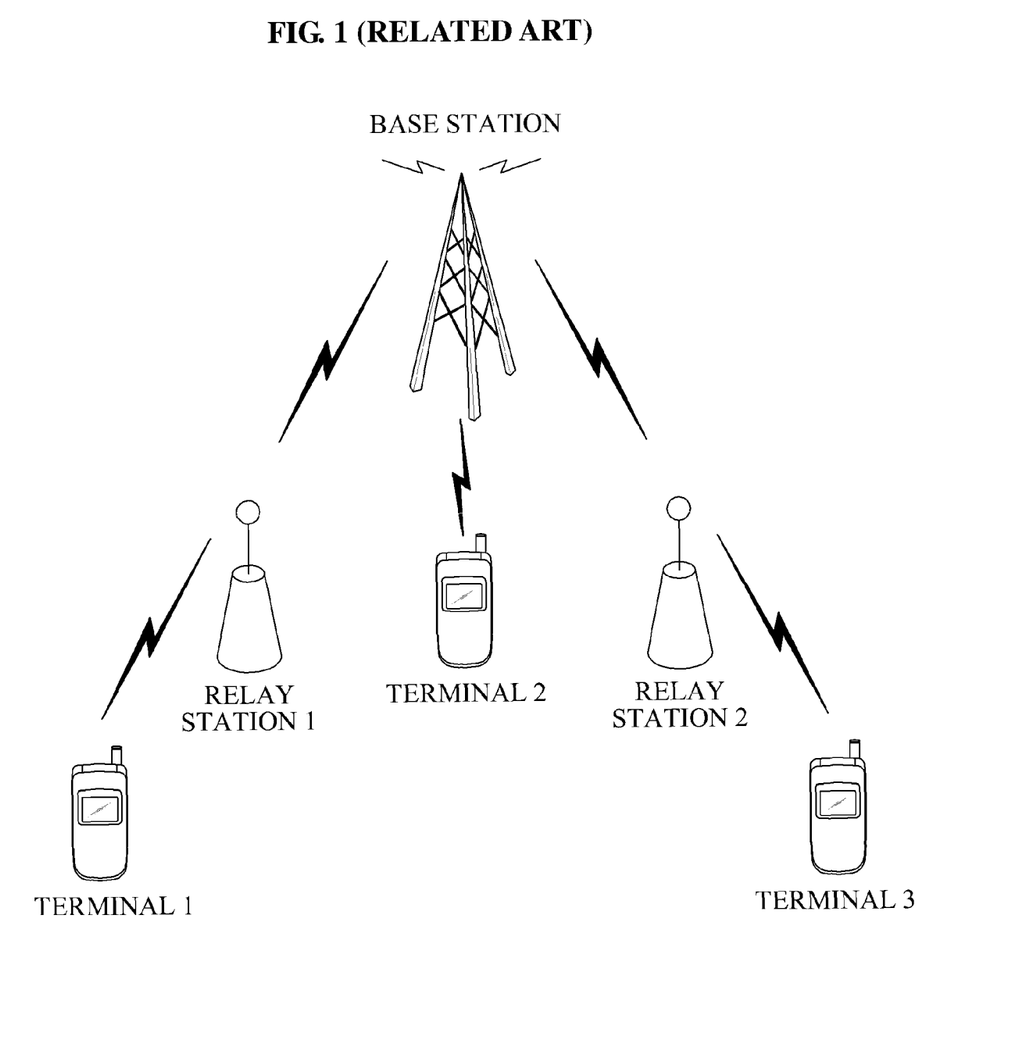
FIG. 1 is a diagram illustrating a communication system having relay stations.

FIG. 1 illustrates a communication system having relay stations.

Referring to FIG. 1, the communication system includes a plurality of communication devices, such as a base station (BS), a plurality of relay stations (RS1 and RS2), and a plurality of terminals (MS1, MS2, and MS3). The communication device that operates in the communication system may include, as an example, a base station, a relay station, a terminal, and the like.

The base station, the plurality of relay stations, and the plurality of terminals may perform downlink communication or uplink communication depending on a data frame designed in advance. In the downlink communication, the base station may transmit signals to the plurality of terminals and the plurality of relay stations, and the plurality of relay stations may transmit signals to the plurality terminals. In the uplink communication, the terminals may transmit signals to the base station and the relay station, and the relay stations may transmit signals to the base station.

Figure 2:
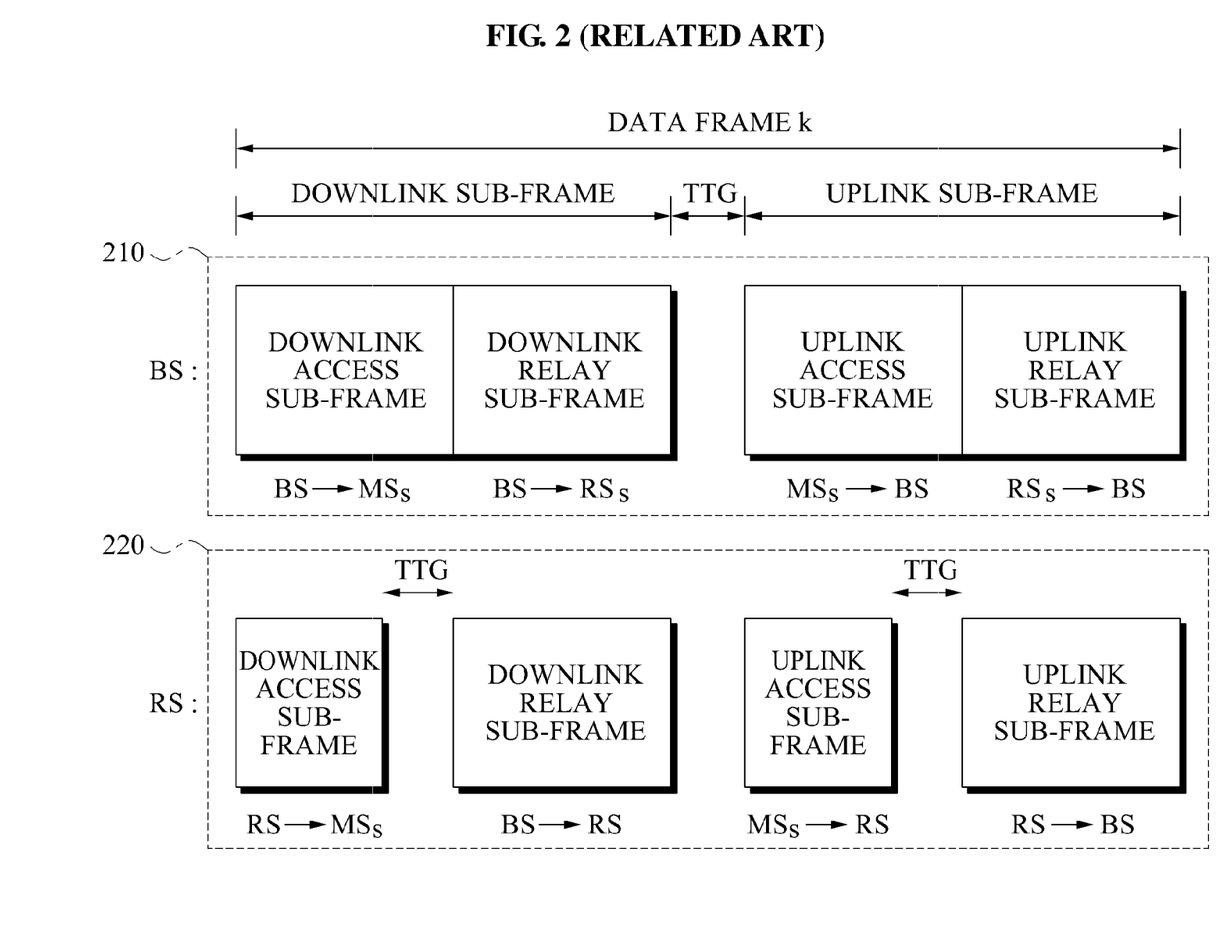
FIG. 2 is a diagram illustrating a data frame according to an IEEE 802.16j standard.

FIG. 2 illustrates a data frame according to an IEEE 802.16j standard.

Referring to FIG. 2, a $k^{th}$ data frame includes a downlink sub-frame and an uplink sub-frame. A communication system performs downlink communication in a downlink sub-frame and performs uplink communication in an uplink sub-frame.

The $k^{th}$ data frame in a base station (BS) and in a relay station (RS) may be different.

Referring to a $k^{th}$ data frame 210 of the base station, a downlink sub-frame of the base station includes a downlink access sub-frame and a downlink relay sub-frame. The base station transmits downlink signals to a plurality of terminals in the downlink access sub-frame of the base station, and transmits downlink relay signals to a plurality of relay stations in the downlink relay sub-frame of the base station. Also, an uplink sub-frame of the base station includes an uplink access sub-frame and an uplink relay sub-frame. The plurality of terminals transmit uplink signals to the base station in the uplink access sub-frame of the base station, and the plurality of relay stations transmit uplink relay signals to the base station in the uplink relay sub-frame.

FIG. 2 also illustrates a $k^{th}$ data frame 220 of a relay station from among the plurality of relay stations. Referring to the $k^{th}$ data frame 220 of the relay station, a downlink sub-frame of the relay station includes a downlink access sub-frame and a downlink relay sub-frame. The relay station transmits downlink signals to the plurality of terminals in the downlink sub-frame of the relay station, and the base station transmits a downlink relay signal to the relay station in the downlink relay sub-frames of the relay stations. Also, an uplink sub-frame of the relay station also includes an uplink access sub-frame and an uplink relay sub-frame. The plurality of terminals transmit uplink signals to the relay station in the uplink access sub-frame of the relay station, and the relay station transmits an uplink relay signal to the base station in the uplink relay sub-frame of the relay station.

The downlink relay sub-frame and the uplink relay sub-frame may be referred to as a relay zone, and the downlink access sub-frame and the uplink access sub-frame may be referred to as an access zone. In general, a frequency resource used in the relay zone may be identical to a frequency resource used in the access zone, to synchronize the plurality of relay stations and the base station and to execute various controls. However, a frequency resource used in an access zone of the base station may be different from a frequency resource used in an access zone of the relay station.

Referring to FIG. 2, a transmitted received transition gap (TTG) may be used to discriminate between the sub-frames and to protect the discriminated sub-frames.

The relay zone may be adaptively controlled based on a number of relay stations or an amount of data transmission of the relay stations. As an example, as the number of the relay stations or the amount of data transmission increases, a length of the relay zone increases.

Figure 3:
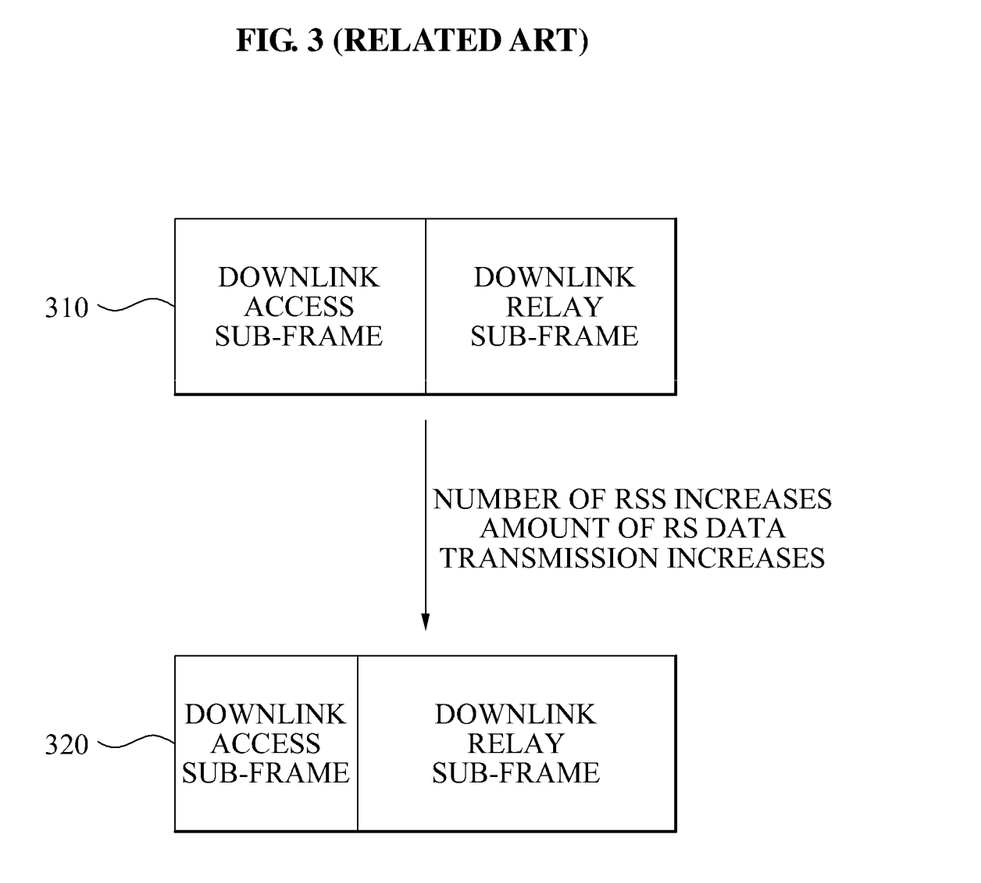
FIG. 3 is a diagram illustrating a variation of a downlink sub-frame as a number of relay stations or a data transmission rate increases, in a data frame according to an IEEE 802.16j standard.

FIG. 3 illustrates a variation of a downlink sub-frame as a number of relay stations or a data transmission rate increases, in a data frame according to an IEEE 802.16j standard.

In FIG. 3, it is assumed that a length of a downlink access sub-frame is identical to a length of a downlink relay sub-frame in an initial downlink sub-frame 310. As the number of relay stations increases or the amount of data transmission increases, the length of the downlink relay sub-frame increases and the length of the downlink access sub-frame relatively decreases in a later downlink sub-frame 320.

When a length of the relay zone increases, a length of the access zone relatively decreases. Also, as the length of the access zone decreases, the amount of data transmitted/received by terminals that do not access a relay station may decrease. As an example, when the length of the access zone decreases in FIG. 1, the amount of data transmitted/received by a terminal 2 that does not access a relay station may decrease. Also, when the length of the relay zone increases, the length of the access zone of the relay station decreases, and thus, in practice, the amount of data transmitted/received by the relay station may decreases.

Accordingly, an exemplary method, data frame, and/or apparatus are described below that may maintain the length of the relay zone and prevent the length of the relay zone from increasing, although the number of relay stations or the amount of data transmission of the relay stations increases.

Figure 4:
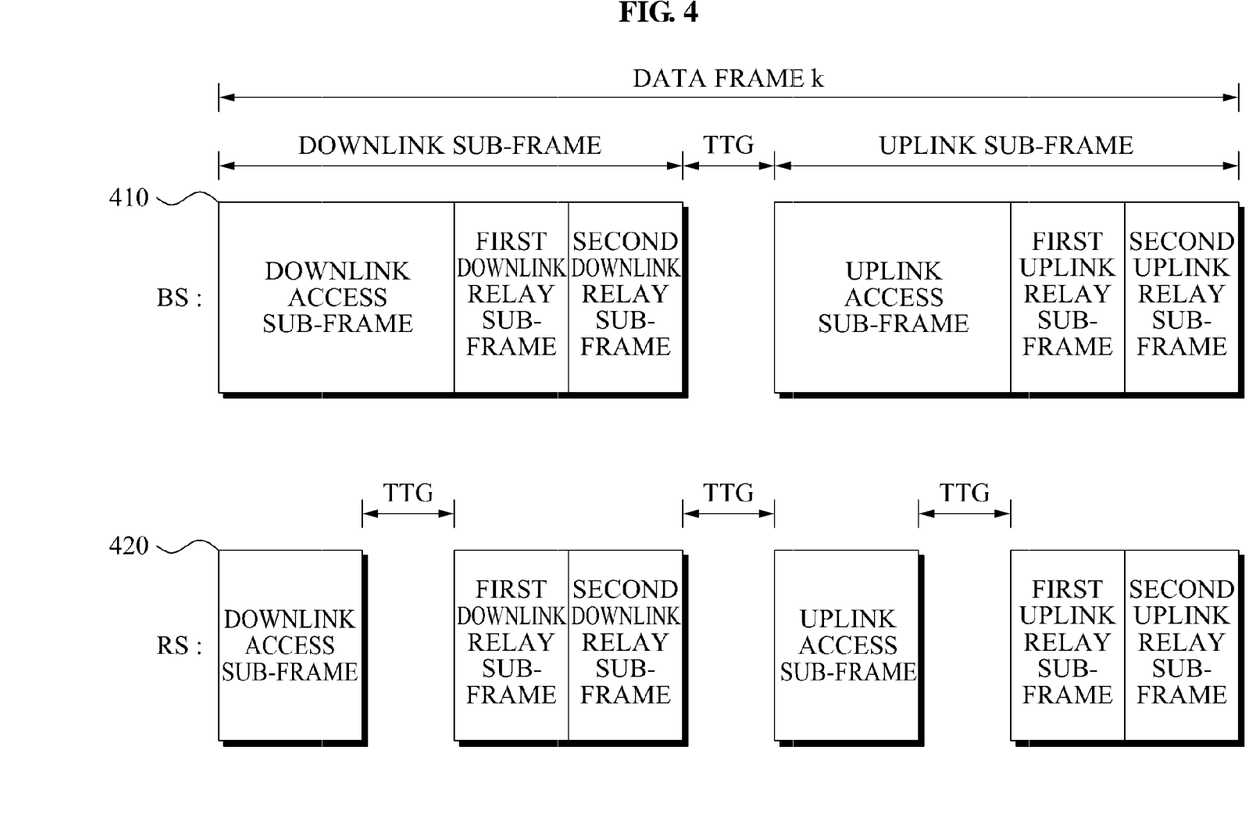
FIG. 4 is a diagram illustrating an exemplary data frame.

FIG. 4 illustrates an exemplary data frame.

Referring to FIG. 4, a $k^{th}$ data frame includes a downlink sub-frame and an uplink sub-frame. Also, the $k^{th}$ data frame of a base station (BS) is illustrated by a $k^{th}$ data frame 410, and the $k^{th}$ data frame of a relay station (RS) is illustrated by a $k^{th}$ data frame 420.

In the $k^{th}$ data frame 410, a downlink sub-frame includes a downlink access sub-frame, a first downlink relay sub-frame, and a second downlink relay sub-frame. Here, a sequence of the downlink access frame, the first downlink relay sub-frame, and the second downlink relay sub-frame is not limited to as shown, but may be variously determined.

The base station transmits downlink signals to a plurality of terminals in the downlink sub-frame of the base station. Also, for example, the base station simultaneously transmits downlink relay signals to relay stations selected from among a plurality of relay stations in a first downlink relay sub-frame. Here, the selected relay stations are determined based on a channel state of downlink channels between the plurality of relay stations and the base station. That is, relay stations that are capable of receiving the downlink relay signals simultaneously transmitted from the base station are determined as 'selected relay stations'. It is understood that the 'simultaneous transmission' or 'simultaneously transmitted' does not mean or is not limited to a simultaneous transmission in a literal or absolute sense, but means or covers a transmission(s) in a substantially simultaneous time.

In this case, in the downlink sub-frame of the base station, the base station simultaneously transmits the downlink relay signals using, for example, at least one of a transmission power control scheme, an interference control scheme, and a multi-antenna transmission scheme. That is, the base station may control a transmission power of the downlink relay signals simultaneously transmitted or may control a phase of the downlink relay signals so as to enable each of the selected relay stations to successfully extract a corresponding downlink relay signal. In addition, since the structure of the base station and the selected relay stations may be similar to a structure of a multi-user multi-input multi-output (MIMO) system, the base station may simultaneously transmit the downlink relay signals to the selected relay stations based on the multi-user MIMO.

In the first downlink relay sub-frame of the base station, the base station may simultaneously transmit the downlink relay signals to the selected relay stations using the same frequency resource. For example, the base station simultaneously transmits the downlink relay signals to the selected relay stations using the same frequency resource in the first downlink relay sub-frame, so as to maximize efficiency in using the time resource and the frequency resource.

In the second downlink relay sub-frame, the base station may transmit the remaining downlink relay signals to the remaining relay stations excluding the selected relay stations from the plurality of relays stations. In this case, in the second downlink relay sub-frame of the base station, the base station schedules a radio resource for the remaining relay stations and transmits the remaining uplink relay signals using the scheduled radio resource. As an example, the base station may transmit a remaining uplink relay signal 1 to a remaining relay station 1 in a time section t1, and may transmit a remaining uplink relay signal 2 to a remaining relay station 2 in a time section t2 that is different from the time section t1.

In the $k^{th}$ data frame 410, an uplink sub-frame of the base station includes an uplink access sub-frame, a first uplink relay sub-frame, and a second uplink relay sub-frame. Here, a length of the first uplink relay sub-frame or a length of the second uplink sub-frame may be adaptively controlled.

The plurality of terminals transmit uplink signals to the base station or to the plurality of relay stations in the uplink access sub-frame of the base station.

In the first uplink relay sub-frame, relay stations selected from among the plurality of relay stations may simultaneously transmit uplink relay signals to the base stations. As described above, the selected relay stations may be determined based on a channel state of uplink channels between the plurality of relay stations and the base station.

The selected relay stations may simultaneously transmit uplink relay signals using various signal processing schemes, so as to minimize the waste of a time resource for a relay zone. As an example, in the first uplink relay sub-frame, the selected relay stations may use, for example, at least one of a transmission power control scheme, an interference control scheme, and a multi-antenna transmission scheme to simultaneously transmit the uplink relay signals. In addition, in the first uplink relay sub-frame, the selected relay stations may transmit the uplink relay signals using the same frequency resource. Accordingly, the selected relay stations may transmit the uplink relay signals using the same frequency resource regardless of scheduling control of the base station.

The base station may schedule a radio resource, for example, especially a time resource, for the second uplink relay sub-frame. Also, in the second uplink relay sub-frame, the remaining relay stations may transmit the remaining relay signals to the base station using the scheduled radio resource.

Referring to FIG. 4, a $k^{th}$ data frame 420 includes a downlink sub-frame and an uplink sub-frame. The downlink sub-frame of the relay station includes a downlink access sub-frame, a first downlink relay sub-frame, and a second downlink relay sub-frame, and the uplink sub-frame of the relay station includes an uplink access sub-frame, a first uplink relay sub-frame, and a second uplink relay sub-frame.

In the downlink access sub-frame of the relay station, the relay station transmits a downlink signal to a plurality of terminals.

The relay station may be operated during at least one of the first downlink relay sub-frame and the second downlink relay sub-frame, depending on whether the relay station is any one of relay stations selected by the base station.

Where the relay station is any one of the relay stations selected by the base station, the relay station may be operated during the first downlink relay sub-frame. That is, during the first downlink relay sub-frame, the base station simultaneously transmits downlink relay signals to the selected relay stations, and the relay station receives the downlink relay signals and extracts a desired downlink relay signal.

Where the relay station is any one of the remaining relay stations, as opposed to being any one of the relay stations selected by the base station, the relay station may be operated during the second downlink relay sub-frame.

As an example, the base station may schedule a time resource for the second downlink relay sub-frame, and may sequentially transmit the remaining downlink relay signals for the remaining relay stations according to the scheduled time resource. In this case, the relay station may receive/extract a desired signal from among the sequentially transmitted remaining downlink relay signals.

In the uplink access sub-frame of the relay station, the plurality of terminals transmit an uplink signal to the base station or the relay stations.

Where the relay station is any one of the relay stations selected by the base station, the relay station simultaneously transmits an uplink relay signal to the base station together with the selected relay stations in the first uplink relay sub-frame. In this case, the relay station may use, for example, at least one of the transmission power control scheme, an interference control scheme, and a multi-antenna transmission scheme.

Where the relay station is any one of the remaining relay station, as opposed to being any one of the relay stations selected by the base station, the relay station transmits the uplink relay signal to the base station in the second uplink relay sub-frame. In this case, the relay station uses a radio resource scheduled by the base station for transmitting the uplink relay signal.

Figure 5:
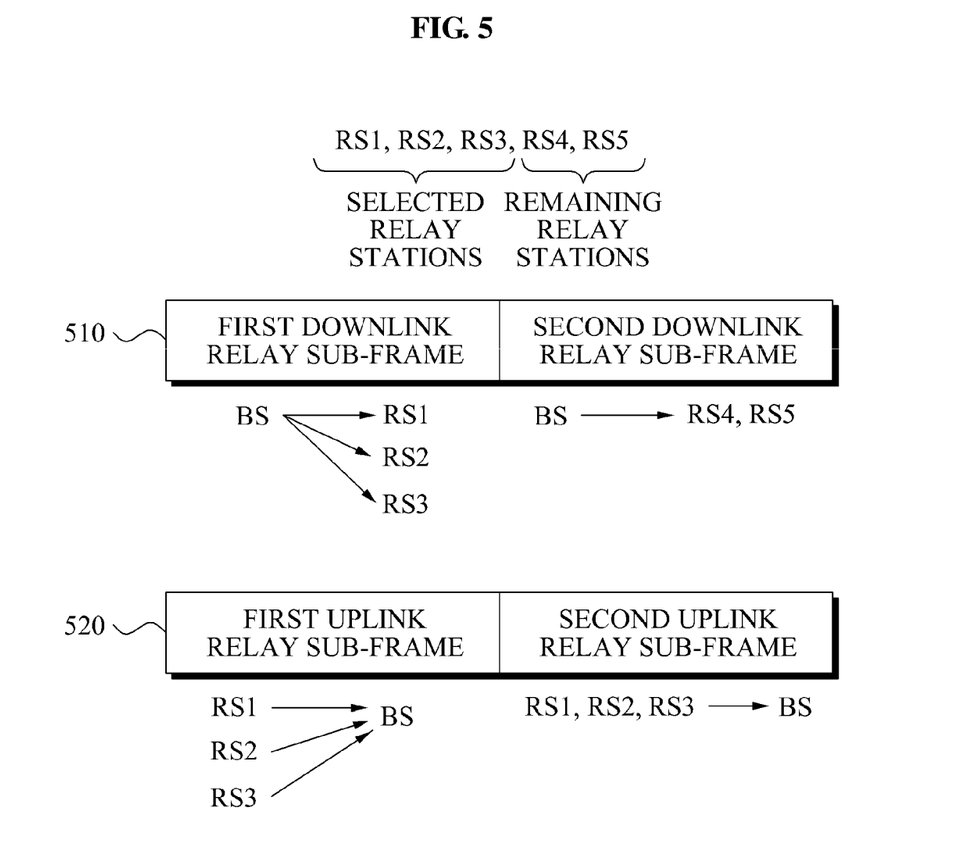
FIG. 5 is a diagram illustrating an exemplary operation of a base station and relay stations during downlink relay sub-frames and uplink relay sub-frames.

FIG. 5 illustrates an exemplary operation of a base station and relay stations during downlink relay sub-frames and uplink relay sub-frames.

During a first downlink relay sub-frame and a second downlink relay sub-frame of a data frame 510, an operation of the base station and the relay stations is performed as illustrated in FIG. 5. It is assumed that RS1, RS2, and RS3 are determined as 'selected relay stations' among five relay stations RS1, RS2, RS3, RS4, and RS5, and RS4, and RS5 are determined as the remaining relay stations.

Referring to the data frame 510, the base station simultaneously transmits downlink relay signals to the selected relay stations RS1, RS2, and RS3 in the first downlink relay sub-frame. For example, the base station simultaneously transmits the downlink relay signals using at least one of a transmission power control scheme, an interference control scheme, and a multi-antenna transmission scheme, so as to effectively use time corresponding to the first downlink relay sub-frame. Also, the base station transmits the remaining downlink relay signals to the remaining relay stations RS4 and RS5 in the second downlink relay sub-frame. For example, the base station uses a scheduled radio resource, for example, especially a time resource, and so as to sequentially transmit the remaining downlink relay signals.

Referring to a data frame 520 of FIG. 5, the selected relay stations RS1, RS2, and RS3 simultaneously transmit uplink relay signals to the base station in the first relay sub-frame. For example, the selected relay stations RS1, RS2, and RS3 may use the same frequency resource. In the second uplink relay sub-frame, the remaining relay stations RS4 and RS5 sequentially transmit the remaining uplink relay signals to the base station according to the radio resource scheduled by the base station.

Figure 6:
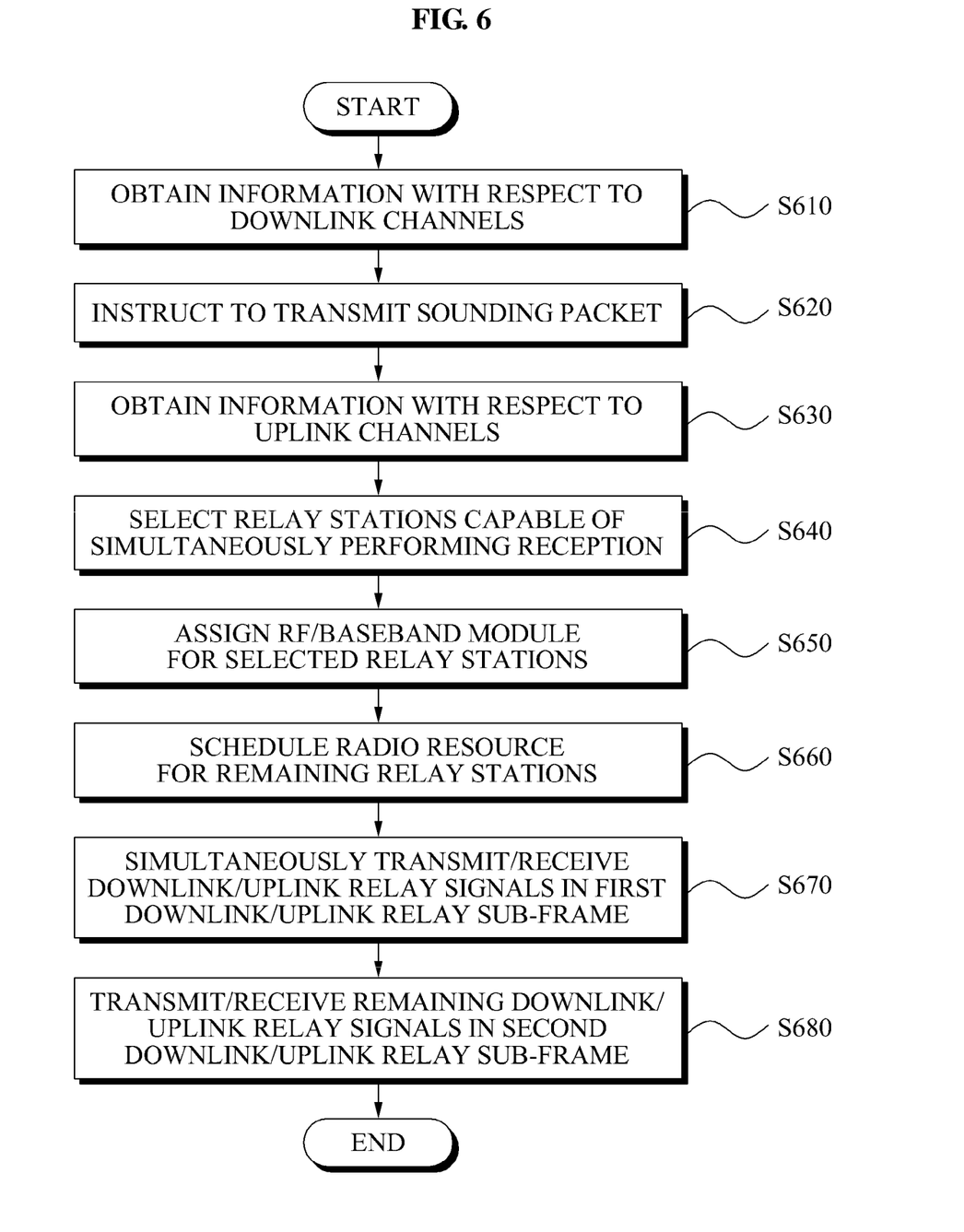
FIG. 6 is a flowchart illustrating an exemplary method of operating a base station.

FIG. 6 is a flowchart illustrating an exemplary method of operating a base station.

Referring to FIG. 6, the base station obtains information with respect to downlink channels between the base station and a plurality of relay stations in operation S610. For example, the base station broadcasts the same number of pilot signals as a number of RF-Baseband modules installed in the base station, and the plurality of relay stations measure the downlink channels and may provide information with respect to the downlink channels to the base station. In a time division duplex (TDD) system, the base station may measure uplink channels and recognize information with respect to the downlink channels based on the measured uplink channels.

In operation S620, the base station instructs the plurality of relay stations to transmit sounding packets to measure the uplink channels.

In operation S630, the base station measures the uplink channels based on the sounding packets transmitted from the plurality of relay stations and obtains information with respect to the uplink channels.

In operation S640, the base station selects at least one relay station from among the plurality of relay stations based on the information with respect to the uplink channels and information with respect to the downlink channels.

In operation S650, the base station assigns an RF/Baseband module for each of the selected at least one relay station. The RF/Baseband module assigned for each of the selected at least one relay station may support various signal processing methods such as the transmission power control scheme, the interference control scheme, the multi-antenna transmission scheme, and the like.

In operation S660, the base station schedules a radio resource, for example, especially a time resource, for the remaining relay stations. As an example, the base station may assign different time resources for each of the remaining relay stations.

In operation S670, the base station simultaneously transmits a downlink relay signal to the at least one selected relay station in a first downlink relay sub-frame, and receives an uplink relay signal simultaneously transmitted from the selected at least one relay station in a first uplink relay sub-frame.

In operation S680, the base station transmits the remaining downlink relay signals to the remaining relay stations using the scheduled radio resource in the second downlink relay sub-frame, and receives the remaining uplink relay signals transmitted from the remaining relay stations in the second uplink relay sub-frame.

Figure 7:
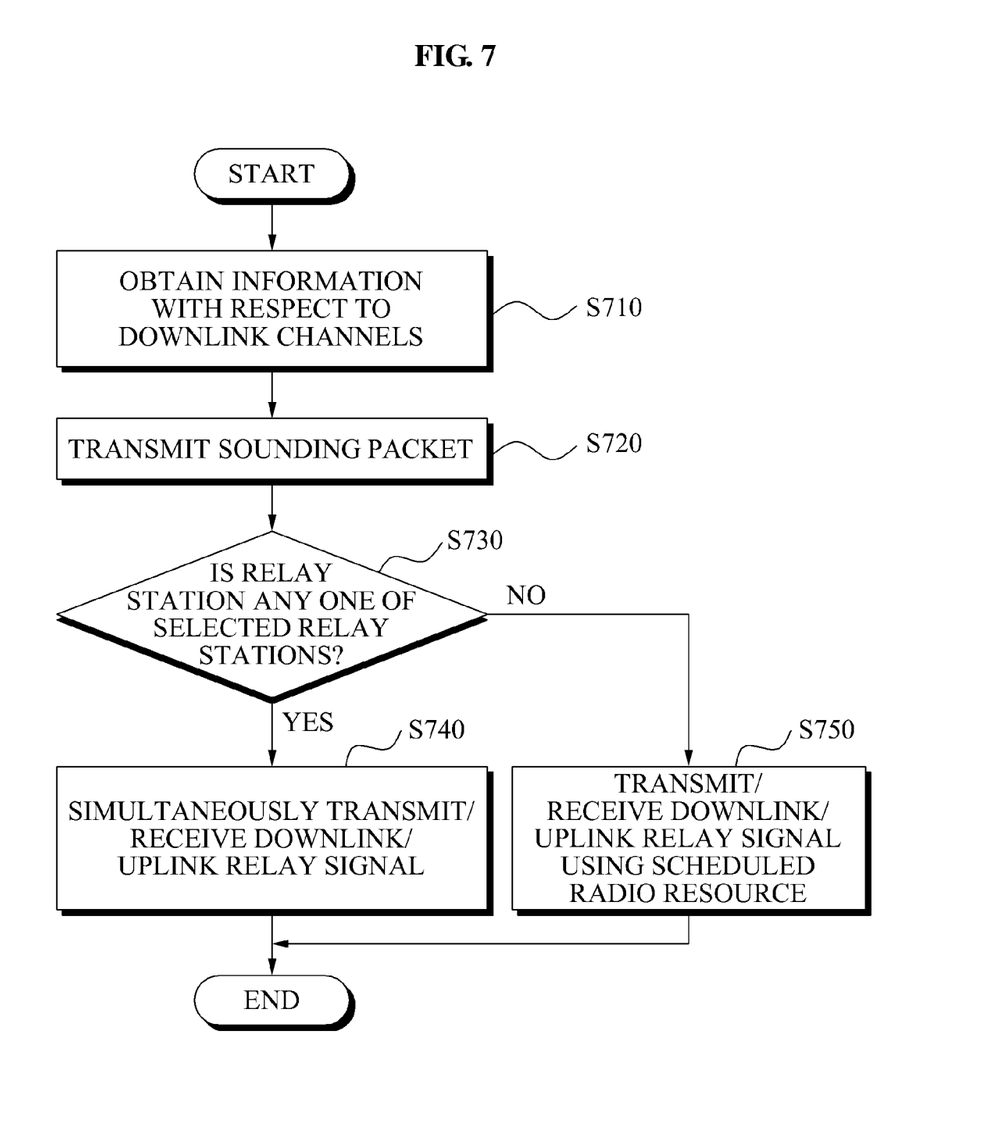
FIG. 7 is a flowchart illustrating an exemplary method of operating a relay station.

FIG. 7 is a flowchart illustrating an exemplary method of operating a relay station.

Referring to FIG. 7, the relay station measures a downlink channel between a base station and the relay station based on pilot signals transmitted from the base station, and feeds back information with respect to the measured downlink channel in operation S710. In a TDD system, although the relay station may not feed back the information with respect to the downlink channel, the base station may recognize the downlink channel based on an uplink channel.

In operation S720, the relay station transmits a sounding packet according to a command of the base station. In this case, the base station measures an uplink channel between the base station and the relay station based on the sounding packet.

In operation S730, the relay station determines whether the relay station is any one of relay stations selected by the base station.

In operation S740, in response to the relay station being any one of the selected relay stations, the relay station simultaneously transmits an uplink signal, for example, together with the selected relay stations, in the first uplink relay sub-frame.

In operation S750, in response to the relay station being any one of the remaining relay stations, as opposed to being any one of the relay stations selected by the base station, the relay station receives a downlink relay signal or transmits the uplink relay signal using a radio resource scheduled by the base station.

Figure 8:
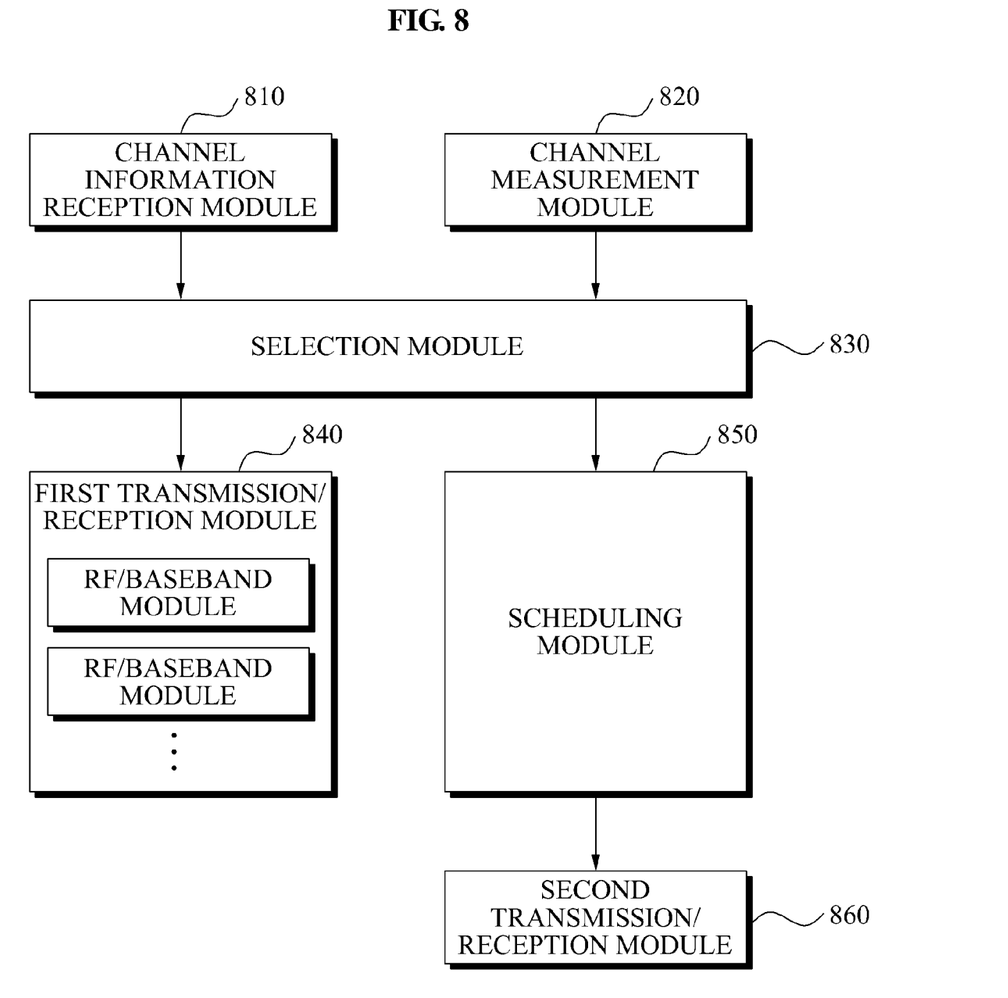
FIG. 8 is a block diagram illustrating an exemplary a base station.

FIG. 8 illustrates an exemplary base station.

Referring to FIG. 8, the base station includes a channel information reception module 810, a channel measurement module 820, a selection module 830, a first transmission/reception module 840, a scheduling module 850, and a second transmission/reception module 860.

The channel information reception module 810 receives channel information with respect to downlink channels between a plurality of relay stations and the base station, from the plurality of relay stations.

The channel measurement module 820 measures uplink channels between the plurality of relay stations and the base station.

The selection module 830 selects a portion of relay stations from among the plurality of relay stations based on the channel information with respect to the downlink channels and a channel state of the uplink channels. Here, the selected relay stations simultaneously transmits uplink relay signals or receives downlink relay signals simultaneously transmitted from the base station.

The first transmission/reception module 840 simultaneously transmits the downlink relay signals to the selected relay stations in a first downlink relay sub-frame or receives the uplink relay signals simultaneously transmitted from the selected relay station in a first uplink relay sub-frame. In this case, the first transmission/reception module 840 may use, for example, at least one of a transmission power control scheme, an interference control scheme, and a multi-antenna transmission scheme. In addition, the first transmission/reception module 840 transmits the downlink relay signals using the same frequency resource or receives the uplink relay signal transmitted from the selected relay stations.

The first transmission/reception module 840 may include a plurality of RF/Baseband modules and assign the plurality of RF/Baseband modules for each of the selected relay stations.

The scheduling module 850 schedules a radio resource for the remaining relay stations. For example, the scheduling module 850 schedules a time resource for the remaining relay stations based on the amount of data transmission of each of the remaining relay stations, and the like.

The second transmission/reception module 860 transmits the remaining downlink relay signals using the scheduled radio resource to the remaining relay stations, or receives the remaining uplink relay signals transmitted from the remaining relay stations.

Figure 9:
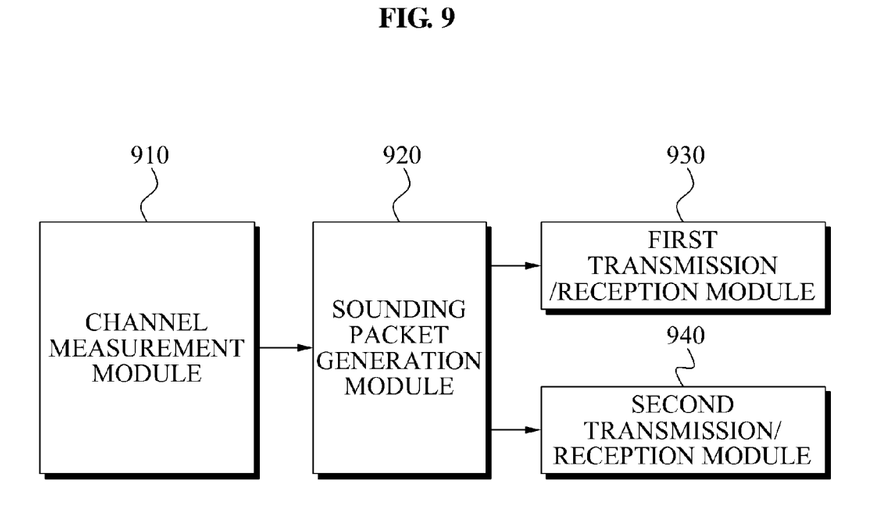
FIG. 9 is a block diagram illustrating an exemplary a relay station.

FIG. 9 illustrates an exemplary relay station.

Referring to FIG. 9, the relay station includes a channel measurement module 910, a sounding packet generation module 920, a first transmission/reception module 930, and a second transmission/reception module 940.

The channel measurement module 910 measures a downlink channel between a base station and the relay station.

The sounding packet generation module 920 generates a sounding packet to enable the base station to measure an uplink channel between the base station and the relay station.

When the relay station is any one of relay stations selected by the base station, the first transmission/reception module 930 simultaneously transmits an uplink relay signal to the base station, for example, together with the selected relay stations, or receives downlink relay signals simultaneously transmitted from the base station to the selected relay stations.

The first transmission/reception module 930 may use, for example, at least one of a transmission power control scheme, an interference control scheme, and a multi-antenna transmission scheme, to transmit the uplink relay signal or to receive the downlink relay signals.

When the relay station is any one of the remaining relay stations, the second transmission/reception module 940 receives the downlink relay signal from the base station using a radio resource scheduled by the base station or transmits the uplink relay signal to the base station.

According to example(s) described above, in a communication system, a base station may simultaneously transmit downlink relay signals to relay stations selected from among a plurality of relay stations in a first downlink relay sub-frame, so as to effectively use a time resource. Accordingly, although the number of relay stations increases or the amount of data transmission increases, a length of a downlink relay sub-frame may decrease.

Also, a base station may schedule a radio resource for the remaining relays in a second downlink relay sub-frame, and transmits the remaining downlink relay signals using the scheduled radio resource.

Also, uplink communication may be performed in a manner similar to the above descriptions so as to effectively use a time resource.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

Again, it is understood that the term 'simultaneous transmission' or 'simultaneously transmitted' used herein does not mean or is not limited to a simultaneous transmission in a literal or absolute sense, but means or covers a transmission(s) in a substantially simultaneous time.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A base station comprising:
 a channel information reception module configured to receive, from a plurality of relay stations, channel information with respect to channels formed between the plurality of relay stations and the base station;
 a selection module configured to select relay stations from among the plurality of relay stations based on the channel information;
 a first transmission and reception module configured to, in a first downlink relay sub-frame among downlink sub-frames, transmit downlink relay signals simultaneously to the selected relay stations; and
 a second transmission and reception module configured to, in a second downlink relay sub-frame among downlink sub-frames, sequentially transmit downlink relay signals to the remaining relay stations using a scheduled radio resource,
 wherein the selection module is configured to determine relay stations that are capable of simultaneously performing reception to select relay stations from among the plurality of relay stations based on the channel information.

2. The base station of claim 1, further comprising:
 a scheduling module configured to schedule a radio resource for the remaining relay stations among the plurality of relay stations,
 wherein the second transmission and reception module is further configured to receive uplink relay signals transmitted from the remaining relay stations.

3. The base station of claim 1, wherein the first transmission and reception module transmits the downlink relay signals to the selected relay stations using at least one of a transmission power control scheme, an interference control scheme, and a multi-antenna transmission scheme.

4. The base station of claim 1, wherein the first transmission and reception module is further configured to receive uplink relay signals transmitted from the selected relay stations, using at least one of a transmission power control scheme, an interference control scheme, and a multi-antenna transmission scheme.

5. The base station of claim 1, wherein the first transmission and reception module is configured to transmit the downlink relay signals using the same frequency resource or receive uplink relay signals transmitted from the selected relay stations.

6. A relay station comprising:
 a first transmission and reception module configured to, in a first uplink relay sub-frame among uplink sub-frames, simultaneously transmit an uplink relay signal to a base station together with selected relay stations among a plurality of relay stations in response to the relay station being one of the relay stations selected by the base station,
 wherein the selected relay stations are selected based on whether the selected relay stations are capable of simultaneously performing reception from among the plurality of relay stations based on a channel information with respect to channels formed between the plurality of relay stations and the base station; and
 a second transmission and reception module configured to, in a second uplink relay sub-frame among uplink sub-frames, transmit an uplink relay signal to the base station using a scheduled radio resource, in response to the relay station being one of the remaining relay stations among the plurality of relay stations,
 wherein the relay station and the remaining relay stations sequentially transmit relay signals in the second uplink relay sub-frame using the scheduled radio resource.

7. The relay station of claim 6, wherein the first transmission and reception module is further configured to receive downlink relay signals transmitted to the selected relay stations from the base station, the first transmission and reception module configured to transmit the uplink relay signal or receive the downlink relay signals, using at least one of a transmission power control scheme, an interference control scheme, and a multi-antenna transmission method.

8. The relay station of claim 6, wherein the selected relay stations are configured to transmit uplink relay signals using the same frequency resource.

9. The relay station of claim 6, further comprising:
a channel estimation module configured to estimate a downlink channel between the base station and the relay station; and
a sounding packet generation module configured to generate a sounding packet used to estimate an uplink channel between the base station and the relay station,
wherein the relay station is determined as one of relay stations selected according to the downlink channel or the uplink channel.

10. An operational method of a base station, the method comprising:
receiving, from a plurality of relay stations, channel information with respect to channels formed between the plurality of relay stations and a base station;
selecting relay stations from among the plurality of relay stations based on the channel information;
transmitting, in a first downlink relay sub-frame among downlink sub-frames, downlink relay signals simultaneously to the selected relay stations; and
sequentially transmitting, in a second downlink relay sub-frame among downlink sub-frames, remaining downlink relay signals to the remaining relay stations using a scheduled radio resource,
wherein the selected relay stations are selected based on whether the selected relay stations are capable of simultaneously performing reception from among the plurality of relay stations based on the channel information.

11. The method of claim 10, further comprising:
receiving uplink relay signals simultaneously transmitted from the selected relay stations,
wherein:
the simultaneously transmitting of the downlink relay signals comprises transmitting the downlink relay signals to the selected relay stations using at least one of a transmission power control scheme, an interference control scheme, and a multi-antenna transmission scheme, and
the receiving of the uplink relay signals comprises receiving the uplink relay signals transmitted from the selected relays using at least one of the transmission power control scheme, the interference control scheme, and the multi-antenna transmission scheme.

12. The method of claim 10, wherein the simultaneously transmitting of the downlink relay signals comprises transmitting the downlink relay signals using the same frequency resource.

13. An operational method of a relay station, the method comprising:
transmitting, in a first uplink relay sub-frame among uplink sub-frames, uplink relay signals simultaneously to a base station together with selected relay stations among a plurality of relay stations, in response to the relay station being one of the selected relay stations selected by the base station,
wherein the selected relay stations are selected based on whether the selected relay stations are capable of simultaneously performing reception from among the plurality of relay stations based on a channel information with respect to channels formed between the plurality of relay stations and the base station; and
transmitting, in a second uplink relay sub-frame among uplink sub-frames, an uplink relay signal to the base station using a radio resource scheduled by the base station, in response to the relay station being one of the remaining relay stations among the plurality of relay stations,
wherein the relay station and the remaining relay stations sequentially transmit relay signals in the second uplink relay sub-frame using the scheduled radio resource.

14. The method of claim 13, further comprising:
measuring a downlink channel between the base station and the relay station; and
generating a sounding packet used to estimate an uplink channel between the base station and the relay station,
wherein the relay station is determined as one of relay stations selected according to a state of the downlink channel or a state of the uplink channel.

15. A non-transitory computer-readable storage medium storing a program to implement an operational method of a base station, comprising instructions to cause a computer to:
receive, from a plurality of relay stations, channel information with respect to channels formed between the plurality of relay stations and a base station;
select relay stations from among the plurality of relay stations based on the channel information;
transmit, in a first downlink relay sub-frame among downlink sub-frames, downlink relay signals simultaneously to the selected relay stations; and
sequentially transmit, in a second downlink relay sub-frame among downlink sub-frames, remaining downlink relay signals to the remaining relay stations using a scheduled radio resource,
wherein the selected relay stations are selected based on whether the selected relay stations are capable of simultaneously performing reception from among the plurality of relay stations based on the channel information.

16. A base station comprising:
a channel information reception module configured to receive, from k relay stations, channel information with respect to channels formed between the plurality of relay stations and the base station;
a selection module configured to select n relay stations, of the plurality of relay stations in which 1<n<k, that are capable, as determined from the channel information, of simultaneously receiving a transmission from the base station; and
a transmission and reception module configured to transmit downlink relay signals simultaneously to the selected n relay stations while excluding k−n relay stations that are not selected,
wherein the transmission and reception module is configured to transmit first downlink relay signals simultaneously to the selected relay stations in one portion of a downlink relay sub-frame, and to sequentially transmit second downlink relay signals to each of the k−n non-selected relay stations through a scheduled resource of another portion of the downlink relay sub-frame.

17. A base station comprising:
a channel information reception module configured to receive, from a plurality of relay stations, channel information with respect to channels formed between the plurality of relay stations and the base station;
a selection module configured to select relay stations from among the plurality of relay stations based on the channel information;

a transmission module configured to, in a first downlink relay sub-frame among downlink sub-frames, transmit downlink relay signals simultaneously to the selected relay stations and, in a second downlink relay sub-frame among downlink sub-frames, sequentially transmit remaining downlink relay signals to the remaining relay stations using a scheduled radio resource, wherein the selection module is configured to determine relay stations that are capable of simultaneously performing reception to select relay stations from among the plurality of relay stations based on the channel information.

18. The base station of claim 17, further comprising:

a scheduling module configured to schedule the radio resource for the remaining relay stations among the plurality of relay stations.

19. The base station of claim 17, wherein the transmission module transmits the downlink relay signals to the selected relay stations using at least one of a transmission power control scheme, an interference control scheme, and a multi-antenna transmission scheme.

20. The base station of claim 17, wherein the transmission module is configured to transmit the downlink relay signals using the same frequency resource.

21. The base station of claim 17, further comprising a reception module configured to receive uplink relay signals simultaneously transmitted from the selected relay stations.

22. The base station of claim 21, wherein the reception module is further configured to receive uplink relay signals transmitted from the selected relay stations, using at least one of a transmission power control scheme, an interference control scheme, and a multi-antenna transmission scheme.

* * * * *